United States Patent
De Cordes

(10) Patent No.: US 10,059,147 B2
(45) Date of Patent: Aug. 28, 2018

(54) SELF-LOCKING NIPPLE FOR WHEEL SPOKE AND METHOD AND APPARATUS FOR MANUFACTURING SAME

(75) Inventor: Amaury De Cordes, Wilrijk (BE)

(73) Assignee: SAPIM, Wilrijk (BE)

( * ) Notice: Subject to any disclaimer, the term of this patent is extended or adjusted under 35 U.S.C. 154(b) by 679 days.

(21) Appl. No.: 14/382,902

(22) PCT Filed: Mar. 7, 2012

(86) PCT No.: PCT/EP2012/053925
§ 371 (c)(1),
(2), (4) Date: Sep. 4, 2014

(87) PCT Pub. No.: WO2013/131564
PCT Pub. Date: Sep. 12, 2013

(65) Prior Publication Data
US 2015/0030411 A1    Jan. 29, 2015

(51) Int. Cl.
*F16B 39/22*  (2006.01)
*B60B 1/04*   (2006.01)
(Continued)

(52) U.S. Cl.
CPC .............. *B60B 1/044* (2013.01); *B21K 1/707* (2013.01); *B60B 1/042* (2013.01); *B60B 1/045* (2013.01); *F16B 39/12* (2013.01); *B60B 2310/213* (2013.01); *B60B 2310/305* (2013.01); *B60B 2310/306* (2013.01); *B60B 2310/314* (2013.01); *B60B 2320/00* (2013.01); *B60B 2360/10* (2013.01); *B60B 2360/104* (2013.01); *B60B 2360/144* (2013.01); *B60B 2900/325* (2013.01); *B60Y 2200/13* (2013.01); *F16B 39/284* (2013.01)

(58) Field of Classification Search
CPC .......... B60B 1/044; B21K 1/707; F16B 39/12
USPC ................................. 411/283, 277, 281, 284
See application file for complete search history.

(56) References Cited

U.S. PATENT DOCUMENTS 546,320 A * 9/1895 Goodrich
1,692,497 A * 11/1928 Guy Furlan ........... B21K 1/707
411/427
(Continued)

FOREIGN PATENT DOCUMENTS

DE        20019973 U1    3/2001
DE        10002527 A1    7/2001
(Continued)

OTHER PUBLICATIONS

Russian Patent Office action dated Dec. 10, 2015 re application No. 2014136701/11(059372).
(Continued)

*Primary Examiner* — Gary Wayne Estremsky
(74) *Attorney, Agent, or Firm* — Patrick J. Daugherty; Driggs, Hogg, Daugherty & Del Zoppo Co., LPA

(57) ABSTRACT

Self-locking nipple for attaching wheel spoke to wheel part. The self-locking function of the nipple is created by deforming the nipple body in a rotationally symmetrical way and over a predetermined axial distance, such that such a narrowed part is created in the internal screw-thread of the nipple which is rotationally symmetric with respect to the longitudinal axis of the nipple and extends over only one to two windings of the internal screw-thread.

12 Claims, 4 Drawing Sheets

(51) Int. Cl.
    *F16B 39/12*     (2006.01)
    *B21K 1/70*     (2006.01)
    *F16B 39/284*     (2006.01)

(56) References Cited

U.S. PATENT DOCUMENTS

| | | | | |
|---|---|---|---|---|
| 1,903,921 | A * | 4/1933 | Rupf | B21K 1/707 411/277 |
| 2,686,546 | A * | 8/1954 | MacLean, Jr. | B21K 1/707 411/277 |
| 3,139,636 | A * | 7/1964 | Abbott | F16B 37/14 470/19 |
| 3,456,704 | A * | 7/1969 | Johnson | B21K 1/707 411/284 |
| 3,734,156 | A * | 5/1973 | Beard | F16B 39/284 411/283 |
| 5,302,067 | A * | 4/1994 | Rath | F16B 39/284 411/281 |
| 5,673,976 | A * | 10/1997 | Hillis | B25B 13/48 301/58 |
| 5,806,935 | A * | 9/1998 | Shermeister | B60B 1/041 301/104 |
| 5,827,027 | A * | 10/1998 | Wakabayashi | B21K 1/707 411/277 |
| 6,205,664 | B1 * | 3/2001 | Cappellotto | B60B 1/045 29/894.33 |
| 8,016,533 | B2 * | 9/2011 | Ackley | B25B 21/001 411/281 |
| 2011/0101768 | A1 * | 5/2011 | Schlanger | B60B 1/003 301/56 |
| 2012/0013171 | A1 | 1/2012 | Chen | |
| 2012/0299365 | A1 * | 11/2012 | Cappellotto | B60B 1/045 301/58 |
| 2013/0049441 | A1 * | 2/2013 | Smart | B60B 21/00 301/55 |
| 2015/0174950 | A1 * | 6/2015 | Schlanger | B60B 1/003 301/58 |

FOREIGN PATENT DOCUMENTS

| | | |
|---|---|---|
| EP | 1844951 A1 | 10/2007 |
| JP | S5322237 A | 3/1978 |
| JP | 56069502 U | 6/1981 |
| WO | WO2011086523 A1 | 7/2011 |
| WO | WO2015033065 A1 | 3/2015 |

OTHER PUBLICATIONS

Chinese Patent Office action dated Nov. 4, 2015 re application No. 201280070991.X.
Taiwan Patent Office action dated Dec. 7, 2015 re application No. 102107475.
European Patent Office action re application No. 12 714 237.0, dated May 13, 2015.
ISA/EP International Search Report dated Jan. 28, 2013 re PCT Application No. PCT/EP2012/053925, filed Mar. 7, 2012.
ISA/EP International Preliminary Report on Patentability dated Jun. 6, 2014 re PCT Application No. PCT/EP2012/053925, filed Mar. 7, 2012.

* cited by examiner

SELF-LOCKING NIPPLE FOR WHEEL SPOKE AND METHOD AND APPARATUS FOR MANUFACTURING SAME

RELATED APPLICATION

This application is a national filing of PCT application Serial No. PCT/EP2012/053925, filed Mar. 7, 2012.

TECHNICAL FIELD

The present invention relates to a self-locking nipple for a wheel spoke.

The present invention further relates to a method and apparatus for manufacturing a self-locking nipple.

BACKGROUND ART

From BE-A-1013147 a self-locking nipple is known which comprises a body with an internally threaded axial opening for receiving an externally threaded end of a wheel spoke. The body of the nipple is locally deformed or compressed, so that the axial opening shows a narrower part which provides a self-locking function, as a result of which in use the end of the wheel spoke is clamped in radial direction by the body of the nipple.

The nipple known from BE-A-1013147 is given the self-locking functionality by placing the nipple between two complementary parts of a clamp, one of which has a V-shaped protrusion which is subsequently pressed into the outer wall of the body in such a way that a plastic deformation occurs which locally narrows the internally threaded axial opening.

It has been found that the self-locking function of the nipple known from BE-A-1013147 is insufficiently precise. In particular, it has been found that the clamping force can vary widely from one nipple to the other.

DISCLOSURE OF THE INVENTION

It is an aim of the present invention to provide a self-locking nipple with a more precise self-locking function.

This aim is achieved according to the invention with the self-locking nipple showing the technical characteristics of the first independent claim.

It is another aim of the present invention to provide a method for manufacturing self-locking nipples with which the self-locking function can be set more precisely.

This aim is achieved according to the invention with a method comprising the steps of the second independent claim.

It is another aim of the present invention to provide an apparatus for manufacturing self-locking nipples with which the self-locking function can be set more precisely.

This aim is achieved according to the invention with an apparatus comprising the technical characteristics of the third independent claim.

According to the invention, the self-locking function is created by deforming the nipple body in a rotationally symmetrical way and over a predetermined axial distance, such that such a narrowed part is created in the internal screw-thread of the nipple which is rotationally symmetric with respect to the longitudinal axis of the nipple and extends over only one to two windings of the internal screw-thread, which is preferably a single-pitch screw-thread.

An analysis of the prior art has shown that the precision of the self-locking function is adversely affected by two factors: asymmetry and height. In the nipple of BE-A-1013147, the narrowed part is created by a deformation on one side of the nipple and over a height of three windings of the internal screw thread. This leads to a large variance in clamping force, since dependent on where the deformation is applied along the circumference of the nipple, the narrowing part could start at the beginning of a winding, or halfway, or at another part of the winding, and likewise end at the beginning of a winding, or halfway, or at another part of the winding, such that the narrowed part could effectively span only two windings or up to a full three windings. The amount of deformation, dependent on the exerted force for deforming the nipple body, could vary as well and add to the variance in clamping force.

According to the invention, the variance can be strongly reduced by one the one hand applying a rotationally symmetric deformation, so that it does not or to a lesser extent matter where along the circumference the deformation is applied, and on the other hand by restricting the height of the deformation which apparently reduces the influence of a variability in the force applied for deforming the nipple.

In embodiments according to the invention, the narrowed part may extend over one winding of the internal screw-thread. It has been found that a narrowed part extending over multiple windings, especially more than two windings, could have a milling effect, i.e. milling off material of the spoke which is screwed in (the material of the nipple is usually harder than the material of the spoke) and adversely affecting the self-locking function.

In embodiments according to the invention, the narrowed part may be located at recesses which are provided in the outside of the body at rotationally symmetric positions (e.g. two positions 180° apart, three positions 120° apart, four positions 90° apart, etc.) and extend over a predetermined length in axial direction of the nipple and/or a predetermined depth in radial direction of the nipple. Preferably there are two such recesses, although other numbers are possible. Preferably they are cone-shaped, although other shapes are possible, e.g. semi-spherical.

In embodiments according to the invention, the narrowed part may be configured for applying a resistive torque of 8-14 cNm, preferably 10-12 cNm to a spoke end which is screwed in. As used herein, with "resistive torque" is meant the amount of torque that needs to be overcome when screwing in the spoke end into the nipple at the narrowed part. No movement occurs until the applied torque exceeds the resistive torque. It has been found that when applying the principles of the invention, a precise range within 2 cNm of resistive torque can be achieved, e.g. a resistive torque within 10-12 cNm.

As mentioned above, the internal screw-thread is preferably a single pitch screw-thread, as this is most common in nipples and spokes. However, within the scope of the invention, the screw-threads may also be multi-pitch, i.e. having multiple helixes parallel to each other, in which case a "winding", as used herein, is to be interpreted as the distance, in axial direction of the screw-thread, from one root/crest up to the subsequent root/crest.

BRIEF DESCRIPTION OF THE DRAWINGS

The invention will be further elucidated by means of the following description and the appended figures.

MODES FOR CARRYING OUT THE INVENTION

Figure 1:
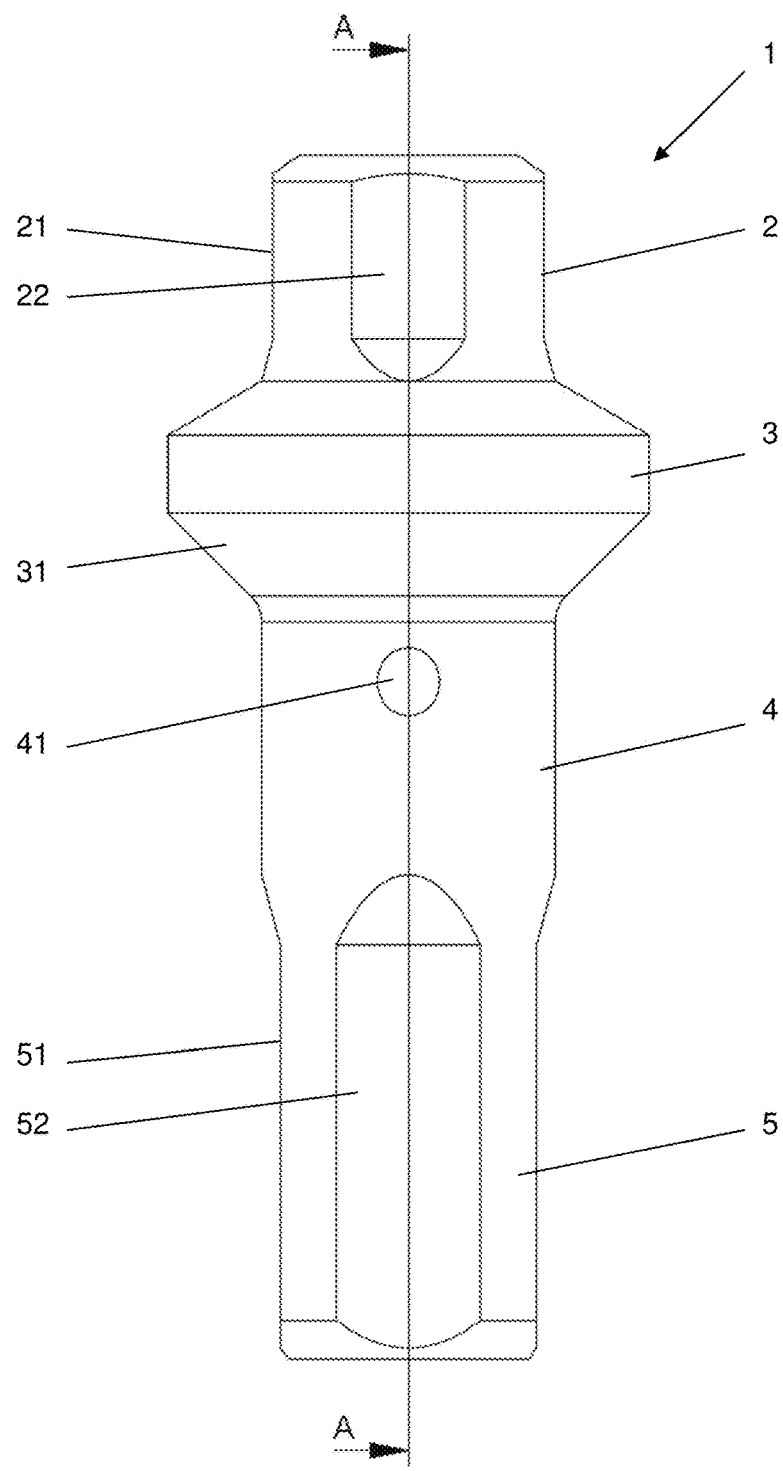
FIG. 1 shows a side view of an embodiment of a self-locking nipple according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

Figure 2:
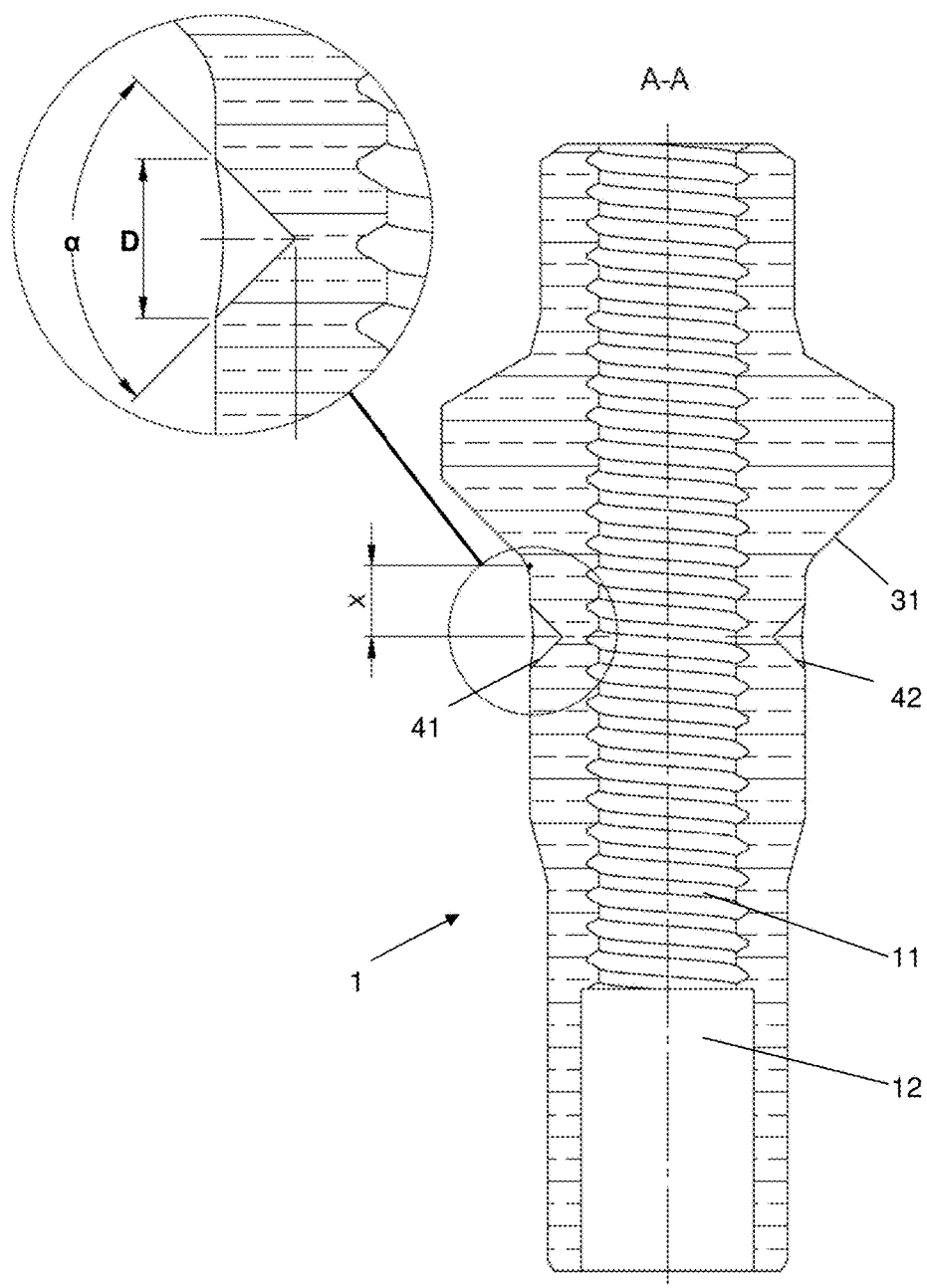
FIG. 2 shows a cross-sectional view along line A-A of FIG. 1, with an enlarged part.
Figure 3:
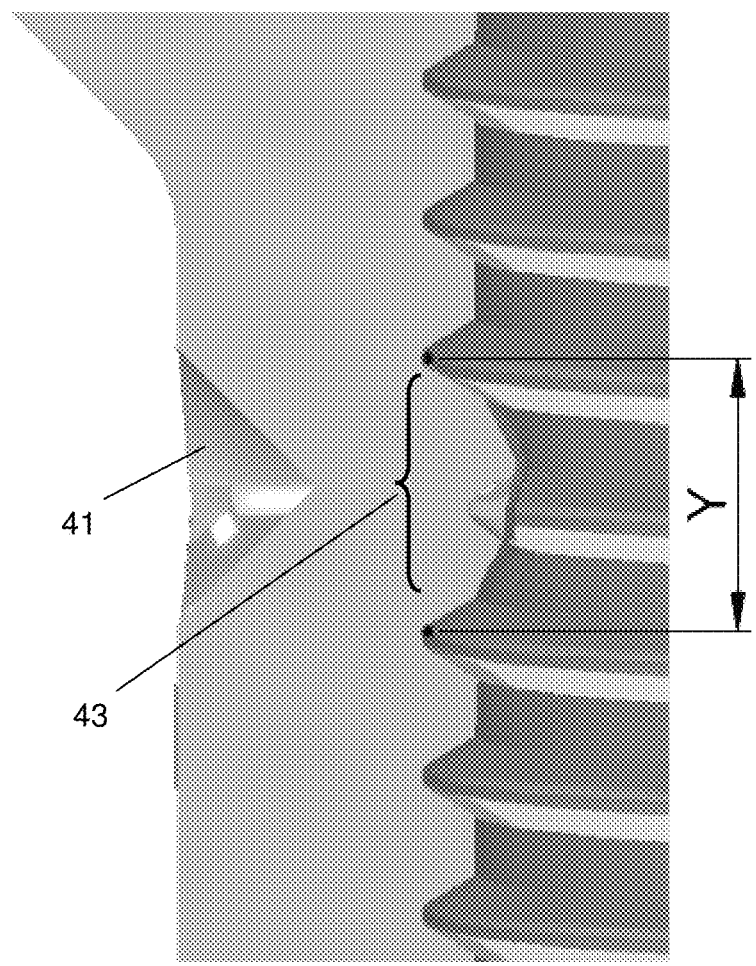
FIG. 3 shows a detail of the deformation of the nipple of FIGS. 1 and 2.

A preferred embodiment of a self-locking nipple according to the invention is shown in FIGS. 1-3. As shown in FIG. 1, the nipple comprises a body 1 which comprises, from top to bottom, an upper square part 2, a head part 3, a cylindrical part 4 and a lower square part 5. The nipple 1 of FIGS. 1-3 is manufactured in brass, but other materials known to the person skilled in the art are possible, such as for example aluminium or an aluminium alloy.

The "square" parts 2 and 5 have in cross section a substantially square shape with respective flanks 21, 22, 51, 52 which are provided for being engaged by tools/machines to rotate the nipple onto a spoke end (not shown). As shown, the square parts 2 and 5 can be of the same size/shape in cross-section, but they may also differ. Instead of a substantially square shape, these parts 2 and 5 may also have other polygonal shapes in cross section, e.g. triangular, pentagonal, hexagonal, etc.

The head part 3 of the body 1 is provided for being seated in a complementary opening or hole in a wheel part (not shown), in particular the wheel rim or hub. To this end, the head part 3 has a larger diameter and has a cone-shaped lower side 31. The lower side 31 may also have a rounded, e.g. spherical shape, so that the nipple can orient itself towards the direction of the spoke end, but this is not essential. This principle is known from U.S. Pat. No. 5,769,584, which is incorporated herein by reference, and therefore needs no further description here.

The cylindrical part 4 of the body 1 has a diameter which is smaller than that of the head part 3 and is in use located in the opening or hole in the wheel part. Recesses 41, 42 (see FIG. 2) are provided in this cylindrical part 4 at rotationally symmetric positions, in this case two cone-shaped recesses 180° apart. These recesses 41, 42 will be described in more detail below.

As shown in FIG. 2, the body 1 of the nipple has a central bore comprising an internal screw-threaded part 11 and an entrance part 12. The screw-thread 11 extends over most of the height of the nipple body 1 and is provided for receiving and holding a spoke end (not shown). The entrance part 12, located at the bottom of the nipple body 1 and extending over most of the lower square part 5 of the body, is not threaded and has an enlarged diameter, slightly larger than that of the spoke end for which the nipple is intended. In this way, the spoke end can first be simple slid into this entrance part 12 and the screwing operation only begins when the spoke end is already held in the correct direction in this entrance part 12. This can highly facilitate the process of screwing the nipple onto the spoke end.

As shown in the detailed part of FIG. 2, the cone-shaped recesses 41, 42 have a diameter D and a top angle $\alpha$. The top angle $\alpha$ is preferably 90°, though this is not essential and also a smaller of larger top angle can be used. The diameter D is, in accordance with the invention, preferably between about once and about twice the pitch of the internal screw-thread 11 of the body. In the embodiment shown, the pitch of the internal screw-thread is 0.454 mm (which is a standard pitch for bicycle wheel spokes) and the diameter is 0.788 mm, but of course other values may be chosen. Instead of a cone shape, also other shapes may be chosen for the recesses 41, 42, such as for example a semi-spherical shape. In the embodiment shown, the recesses 41, 42 are applied at a distance x of about twice the pitch of the screw-thread from the top of the cylindrical part 4, i.e. where the lower side 31 of the head part 3 ends.

Figure 4:
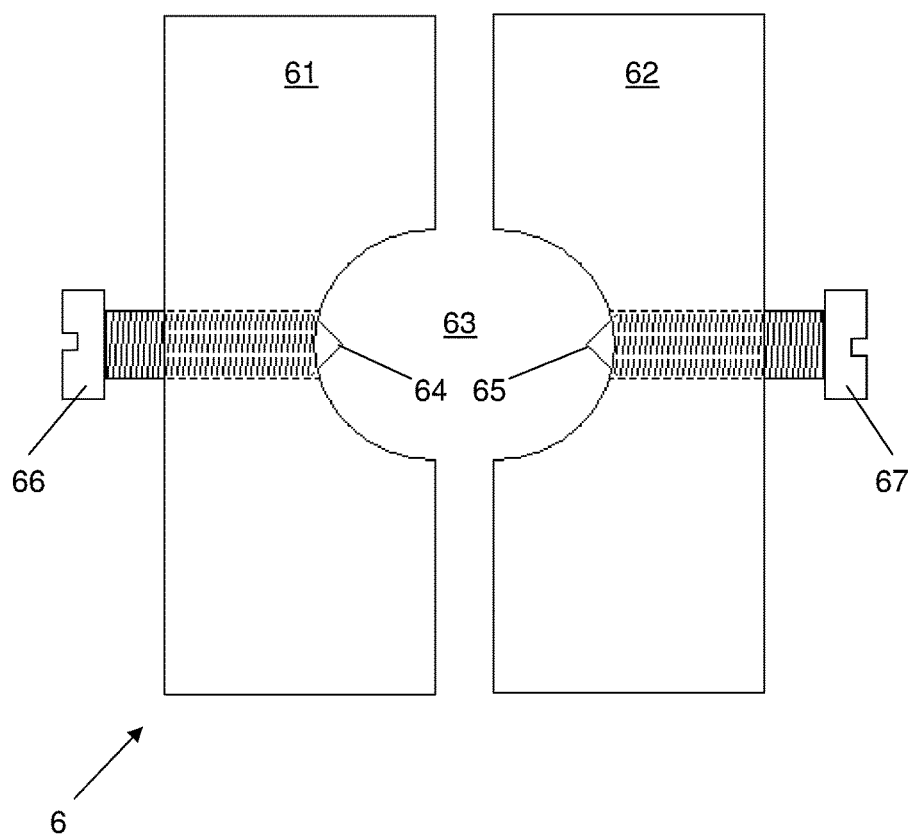
FIG. 4 shows an apparatus for deforming a spoke nipple to apply a self-locking function thereto according to a preferred embodiment of the invention.

These recesses 41, 42 result from a deformation step which is applied to the cylindrical part 4 of the nipple body 1, by means of a clamping device, an embodiment of which is shown in FIG. 4. In this deformation step, protrusions are pressed into the cylindrical part at the rotationally symmetrical positions to form the recesses 41, 42 and more importantly to locally deform the internal screw-thread 11, such that a narrowed part 43 is formed to obtain the desired self-locking function of the nipple. This is shown in detail in FIG. 3. The narrowed part 43—since it results from rotationally symmetric deformation—is rotationally symmetric with respect to the longitudinal axis of the nipple and extends over one to two windings of the internal screw-thread 11, i.e. the maximum distance is Y, depicted in FIG. 3, which equals twice the pitch of the internal screw-thread. Note that the height of the narrowed part 43 does not entirely correspond to the diameter D of the recesses 41, 42 (in fact its height is somewhat smaller than the diameter D) which is due to the fact that, due to material flow, the deformation on the outside is not the same as the deformation on the inside of the nipple.

It has been found that, as a result of this narrowed part 43 of predetermined size and being rotationally symmetric, the variance in the self-locking operation of the nipple can be strongly reduced. Due to the rotationally symmetric deformation, it does not or to a lesser extent matter where along the circumference of the cylindrical part 4 of the body 1 the deformation is applied. Due to the restriction in height of the deformation to the maximum Y, apparently the influence of a variability in the force applied for deforming the nipple can be reduced. In particular, in the embodiment shown, the narrowed part 43 applies a resistive torque of 10-12 cNm to a spoke end which is screwed in, so the variance is reduced to 2 cNm in resistive torque, which has not been achieved in the prior art.

The clamping device 6 shown in FIG. 4 comprises two clamp halves 61, 62 which together have a central opening 63 for receiving the cylindrical part 4 of the nipple. The diameter of this central opening 63 corresponds to that of the cylindrical part 4 of the nipple. A clamping mechanism (not shown) is provided for pressing the clamp halves towards and against each other. Upon clamping, protrusions 64, 65 are forced into the outside of the cylindrical part 4 of the nipple body 1, thereby forming the recesses 41, 42 on the outside of the nipple and the narrowed part 43 on the inside of the nipple. These protrusions 64, 65 are the tips of two set screws 66, 67, by means of which the amount of deformation can be set. This is done by rotating the set screws 66, 67 to vary the extent to which they protrude into the central opening 63 of the clamping device. In the embodiment shown, the tips 64, 65 are cone-shaped, but other shapes may be chosen depending on the desired deformation. Instead of using the tips of the set screws as the protrusions, also other protruding elements may be used and another setting mechanism for setting the extent of protrusion can be envisaged. If deformation at more than two rotationally symmetric locations is desired, a similar clamping device with a corresponding number of clamping members, each having one set screw, can be used, e.g. three clamping members each covering 120° of the circumference of the nipple, four clamping members each covering 90° of the circumference of the nipple, etc.

The invention claimed is:

1. A self-locking nipple provided for fixing a wheel spoke to a wheel part, the nipple comprising:
   a body having a generally cylindrical outer surface defined from a longitudinal axis of the body and configured for insertion through a hole in a wheel part;
   the body defining an internally threaded axial opening and comprising an internal screw-thread defined relative to and extending along the longitudinal axis;
   first and second cone-shaped deformation recesses formed in the body outer surface in response to pressing protrusions into the body outer surface, the first and second deformation recesses located rotationally symmetrical relative to each other about the longitudinal axis;
   a first narrowed part formed on the internal screw-thread in response to pressing a first of the protrusions into the body outer surface to form the first deformation recess; and
   a second narrowed part formed on the internal screw-thread in response to pressing a second of the protrusions into the body outer surface body outer surface to form the second deformation recess; and
   wherein the first narrowed part and the second narrowed part of the internal screw-thread are located rotationally symmetrical with respect to each other about the longitudinal axis and each extend over a range of from one to two windings of the internal screw-thread, wherein the first narrowed part and the second narrowed part are thereby configured to clamp onto a threaded end of a wheel spoke located therebetween and consist of an entirety of narrowed parts of the internal screw-thread that are configured to engage windings of the externally threaded end of a wheel spoke screwed into the internal screw-thread of the axial opening and to thereby clamp onto a threaded end of a wheel spoke located therebetween with a clamping force.

2. The self-locking nipple according to claim 1, wherein the first narrowed part and the second narrowed part each extend over only one winding of the internal screw-thread.

3. The self-locking nipple according to claim 2, wherein the first and second recesses are located 180 degrees from each other about the longitudinal axis.

4. The self-locking nipple according to claim 3, wherein said cone-shaped first and second recesses are formed to have a diameter between about once and about twice a pitch of the internal screw thread, and a top angle of about 90 degrees.

5. The self-locking nipple according to claim 4, wherein the clamping force of the first narrowed part and the second narrowed part is configured to comprise a resistive torque of 8-14 cNm that is applied to windings of a threaded end of a wheel spoke located therebetween and screwed into the internal screw-thread of the axial opening.

6. The self-locking nipple according to claim 5, wherein the resistive torque is 10-12 cNm.

7. A method for manufacturing a self-locking nipple, comprising the steps of:
   forming a nipple body having a generally cylindrical outer surface defined from a longitudinal axis of the body and configured for being inserted through a hole in a wheel part;
   forming an internally threaded axial opening comprising an internal screw-thread defined relative to and extending along the longitudinal axis of the nipple body;
   deforming the nipple body by means of a clamping device pressing protrusions into the body outer surface, thereby forming first and second cone-shaped deformation recesses in the body outer surface that are located rotationally symmetrical relative to each other about the longitudinal axis, thereby forming a first narrowed part in the internal thread of the internally threaded axial opening in response to pressing a first of the protrusions into the body outer surface to form the first deformation recess, and thereby forming a second narrowed part in the internal thread of the internally threaded axial opening in response to pressing a second of the protrusions into the body outer surface body outer surface to form the second deformation recess, wherein the first narrowed part and the second narrowed part are thereby configured to clamp onto a threaded end of a wheel spoke located therebetween and consist of an entirety of narrowed parts of the internal screw-thread that are configured to engage windings of an externally threaded end of a wheel spoke screwed into the internal screw-thread of the axial opening and to thereby clamp onto a threaded end of a wheel spoke located therebetween with a clamping force to provide a self-locking function to the nipple, as a result of which in use a threaded end of a wheel spoke is clamped in the axial opening of the nipple;

wherein said deformation by means of said clamping device is performed in a rotationally symmetric way, such that the first narrowed part of the internal screw-thread is rotationally symmetric relative to the second narrowed part of the internal screw-thread with respect to the longitudinal axis of the nipple, and the first narrowed part and the second narrowed part each extend over a predetermined length in an axial direction of the nipple over a range of from one to two windings of the internal screw-thread.

8. The method according to claim 7, wherein the clamping device for applying the deformation comprises a set of protrusions at rotationally symmetric positions with respect to the axis of a nipple clamped in the clamping device.

9. The method according to claim 8, further comprising the step of:

setting the size of the protrusions in at least one direction selected from the axial direction of the clamped nipple and a radial direction of the clamped nipple, to control the amount of deformation applied in said deforming step.

10. The method according to claim 9, wherein the step of setting the size of the protrusions is performed by means of set screws.

11. The method according to claim 10, wherein the protrusions are formed by tips of the set screws which protrude into a central opening of the clamping device.

12. The method according to claim 7, wherein said step of deforming the nipple in the clamping device comprises applying a predetermined deformation to the nipple such that the obtained first and second narrowed parts are configured for applying a resistive torque of 8-14 cNm to windings of a threaded end of a spoke end which is located therebetween and screwed into the internal screw-thread of the axial opening.

* * * * *